United States Patent [19]

Hayward

[11] Patent Number: 5,281,481
[45] Date of Patent: Jan. 25, 1994

[54] POWDER COATING OF THERMOSETTING ADHESIVES ONTO METAL SUBSTRATES TO ENABLE A FRICTION MATERIAL TO BE BONDED TO THE METAL SUBSTRATE

[75] Inventor: Thomas W. Hayward, Westmont, Ill.

[73] Assignee: Borg-Warner Automotive Transmission & Engine Components Corporation, Sterling Heights, Mich.

[21] Appl. No.: 843,376

[22] Filed: Feb. 28, 1992

[51] Int. Cl.$^5$ .................. B32B 27/38; F16D 69/04
[52] U.S. Cl. ...................... 428/416; 428/419; 428/530; 428/414; 188/234; 188/250 G; 192/107 M; 156/283
[58] Field of Search ............... 428/414, 419, 416, 530

[56] References Cited

U.S. PATENT DOCUMENTS 2,560,033 7/1951 Nanfeldt .
2,581,926 1/1952 Groten et al. .
2,631,961 3/1953 Antheil .
2,943,712 7/1960 Curtiss et al. .
3,037,860 6/1962 Masterson et al. .
3,348,640 10/1967 Thompson et al. .

FOREIGN PATENT DOCUMENTS 0415381 3/1991 European Pat. Off. .
2190968A 12/1987 United Kingdom .

Primary Examiner—P. C. Sluby
Attorney, Agent, or Firm—Emch Schaffer, Schaub

[57] ABSTRACT

The present invention relates to a method of manufacturing a composite friction element wherein a powdered solventless thermosetting adhesive is applied to a metal substrate and the product made therefrom. The metal substrate and thermosetting adhesive material are heated to allow the powdered solventless adhesive material to flow but not crosslink. A friction material is applied under heat and pressure to the adhesive material such that the adhesive material crosslinks and a composite friction element is formed.

23 Claims, 3 Drawing Sheets

POWDER COATING OF THERMOSETTING ADHESIVES ONTO METAL SUBSTRATES TO ENABLE A FRICTION MATERIAL TO BE BONDED TO THE METAL SUBSTRATE

TECHNICAL FIELD

This invention relates to a composite friction element comprising a metal substrate having adhered thereto (without the use of liquid solvent-based adhesives) a friction material and a process for bonding a friction material to a metal substrate. More particularly, the invention relates to a process for bonding a friction material to a metal substrate using a powdered coating of a thermosetting adhesive material. The friction materials are bonded to the metal substrate conveniently and safely without imposing a significant threat to human health and environment.

BACKGROUND ART

Typical state of the art adhesives which are used in bonding friction materials to metal substrates all use phenolic based or n-butyl modified nitrile rubber based thermosetting adhesives. These adhesives contain solvents such as methyl ethyl ketone (MEK), ethanol, methanol, or acetone. The solvent is typically present in an amount ranging from about twenty percent to over eighty percent, by volume, with the remainder being the thermosetting adhesive material. The presence of the solvent allows the adhesive to be thinned out and distributed on the metal substrate in a uniform coating.

These solvent-based adhesives are applied using a variety of methods such as roll coating onto metal or friction paper, flow-coating onto metal or paper, wet spray from a nozzle onto metal, dipping of the metal and the like. The adhesive is applied wet to the substrate (metal or paper) and the solvent is thereafter allowed to evaporate off leaving the adhesive in solid form on the surface. The solvents that evaporate from the adhesive must be captured and reclaimed or burned off using air pollution control equipment in order to meet EPA requirements.

These solvent-based adhesives are considered a health risk with some of the solvent-based adhesives containing carcinogens. Therefore, rigorous air pollution control equipment is required to recover the solvent from the adhesive material.

The solvent-based adhesive is applied to a variety of metal substrates including, for example, transmission bands and core plates, which have irregular shapes. Thus, it has been preferred that the solvent-based adhesive be applied to the metal substrate by dipping the irregularly shaped metal substrate into the solvent-based adhesive. However, this dipping method often causes drips, sags or runs of the adhesive material to occur on the metal substrate. The extra adhesive material in the drip or run must be removed from the substrate prior to the application of the friction material. If the extra adhesive material is not removed, the drip will cause a bump or ridge in the friction material. Any ridge or irregularity is totally unacceptable since its presence will cause the composite friction element to wear unevenly or fail to engage evenly. In addition, it is difficult to control the thickness of the adhesive deposited on the metal substrate. During evaporation of the solvent, the adhesive viscosity changes, which in turn causes the thickness of the adhesive applied to the metal substrate to change. Therefore, process control of adhesive application and adhesive viscosity is difficult to maintain.

Therefore, it is an object of this invention to provide a process for bonding a friction material to a metal substrate without the use of solvent-based adhesives.

A further object of this invention is to provide composite friction elements comprising a metal substrate having adhered thereto without the use of a liquid solvent based adhesive, a friction material.

Yet another object of this invention is to provide a process for bonding a friction material to a metal substrate conveniently and safely without imposing significant threats to human health and the environment by the elimination of the need for liquid solvent based adhesives.

DISCLOSURE OF INVENTION

The present invention achieves these objectives by providing a method for bonding a friction material to a metal substrate using a powdered coating of a thermosetting adhesive. The present invention also relates to a composite friction element comprising a metal substrate having adhered thereto, with the use of a solid thermosetting adhesive, a friction material.

Various types of metal substrate materials including clutch plates, transmission bands, brakeshoes, synchronizer rings, friction discs, piston plates and the like can be used with the present invention.

In addition, various known types of friction materials are useful with the present invention, including for example, phenolic resin impregnated papers used in the transmission art. Other types of friction materials such as those used in the brake art can also be used in the present invention.

The powder thermoplastic adhesive materials useful in the present invention contain no solvents. Rather, the adhesive materials are 100% solids. Therefore, since no solvents are used, the ease in manufacturing the composite friction element is greatly increased.

The present invention provides a more efficient utilization of adhesive materials. About 98% of the powder thermosetting adhesive material is used when a reclaim system is used to recover the powdered adhesive material. In contrast, with solvent-based systems the utilization efficiency of the liquid adhesive ranges from under about 65% to about 80%.

BEST MODE OF CARRYING OUT THE INVENTION

Figure 1:
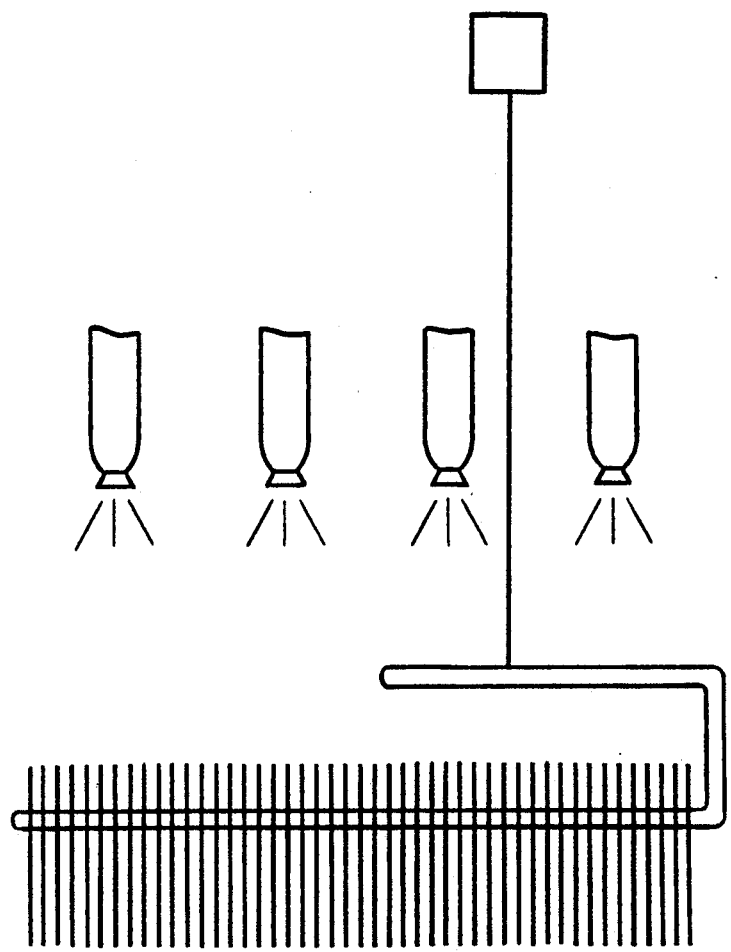
FIG. 1 is a schematic diagram showing deposition of thermosetting adhesive material on a metal substrate.

According to the present invention the use of a solventless thermosetting adhesive requires no need for air pollution control. Since the adhesives are 100% solids there is less waste of adhesive material. The thermosetting adhesive powder can be applied only to the areas that require adhesive. The metal substrate can be masked with an inexpensive, removable mask material if desired.

The powder adhesive can be applied to the metal substrate using a variety of processes including, for example, an electrostatic spray gun application process or a fluidized bed which ensures a uniform deposition of powder adhesive material on the metal substrate. The use of powder adhesive materials thus provide better thickness control than the solvent-based adhesive materials.

Various thermosetting adhesive materials found to be especially suitable are manufactured by Morton International of Reading, PA. The powder adhesive coatings are an epoxy-phenolic type or an epoxy-aromatic amine type cure chemistry accelerated with an imidazole catalyst. The powder adhesive material also preferably contains a flow control agent such as GT-7226 resin described below and optionally may contain at least one catalyst and filler material. Suitable filler materials include feldspar and other like filler materials.

The powder coating thermosetting adhesive materials are made under standard processing conditions. The formulation of useful thermosetting powder adhesive materials can include, wherein WPE=weight per epoxy, at least one of the following resins which are available from Ciba Geigy, based on the weight percent of the resin:

- about 0–70 wt. %, and in certain embodiments 30–65 wt. % of GT-7013 resin-Bisphenol-A epoxy resin, unmodified; WPE=650–725;
- about 0–70 wt. %, and in certain embodiments 30–65 wt. % of GT-7220 resin-Bisphenol-A epoxy modified with novolac epoxy; WPE=500–560;
- about 0–95 wt. %, and in certain embodiments about 30–95 wt. % of ECN-9699 resin-multifunctional epoxy O-cresol novolac resin; WPE=235;
- about 5–10 wt. %, and in certain embodiments about 7–9 wt. % of GT-7226 resin-Bisphenol-A epoxy resin with Acranol 4F ®-type acrylic acid butyl ester flow modifier; WPE=800–860;

The following additional ingredients are optionally present in the thermosetting adhesive material formulations, based on parts per hundred of the resin formulation:

- about 0–30, and in certain embodiments about 10–25, of a curative agent such as HT-9690 phenolic o-cresol novolac resin (hydroxyl type);
- about 0–25, and in certain embodiments about 18–22, of an aromatic amine such as HT-976 aromatic amine 4,4' diaminodiphenyl sulfone;
- about 0.050–0.5, and in certain embodiments about 0.075–0.4, of an imidazole catalyst such as MB-2 imidazole; and
- about 0–150, and in certain embodiments about 115–125, 0–80 or 0–50 of at least one filler material such as Minspar #3.

Table 1 below provides various examples of powder adhesive material formulations.

TABLE 1

EXAMPLES OF POWDER THERMOSETTING ADHESIVE MATERIAL

| | 1 | 2 | 3 | 4 | 5 | 6 | 7 |
|---|---|---|---|---|---|---|---|
| (Based on Wt. percent of resin formulation) | | | | | | | |
| GT-7013 Resin | 60 | 32 | 60 | 32 | 0 | 0 | 0 |
| GT-7220 Resin | 32 | 60 | 32 | 30 | 0 | 0 | 0 |
| ECN 9699 Resin | 0 | 0 | 0 | 30 | 92 | 92 | 92 |
| GT-7226 Resin | 8 | 8 | 8 | 8 | 8 | 8 | 8 |

TABLE 1-continued

EXAMPLES OF POWDER THERMOSETTING ADHESIVE MATERIAL

| | 1 | 2 | 3 | 4 | 5 | 6 | 7 |
|---|---|---|---|---|---|---|---|
| (Based on parts per hundred of resin formulation) | | | | | | | |
| HT-9690 Phenolic | 15 | 15 | 25 | 15 | 10 | 0 | 0 |
| HT-976 Aromatic Amine | 0 | 0 | 0 | 0 | 0 | 20 | 20 |
| MB-2MI Imidazole | 0.2 | 0.1 | 0.1 | 0.2 | 0.075 | 0.4 | 0.3 |
| Minspar #3 Filler | 0 | 0 | 0 | 0 | 0 | 0 | 120 |

The present invention can be practiced as follows.

Often the metal substrate has thin film of oil which is applied to the metal substrate during the manufacturing process to produce the metal substrate. Prior to application of the powder thermosetting adhesive material to the metal substrate, the surface of the metal substrate is prepared to receive the adhesive material. The surface of the metal substrate can be cleaned or prepared by such various methods as grit blasting, washing, galvanic etching and/or acid etching of the surface. In certain embodiments it is preferred that the metal substrates are grit blasted in a manner known in the art wherein for example grit ranging in size from 60 grit to 120 grit using nozzles ranging in size from ⅛" to ¼" in size are used. The grit is delivered at about 90 psi air.

Acid etch cleaning is an alternative to the grip blasting procedure wherein the metal substrates are washed in an alkaline spray washer at about 160° F. followed by a hot water rinse at about 160° F. The metal substrate parts are then dipped in 15–25% sulfuric acid at 160°–180° F. The metal substrate parts are then cold rinsed and dipped into a neutralizer such as a cold saturated solution of soda ash and then rinsed with hot water at about 180° F. and allowed to air dry.

Another common surface preparation technique includes the use of iron phosphate which consists of washing the metal substrate in an alkaline water wash at about 160° F., followed by a hot water rinse at about 160° F. The metal substrate is washed in iron phosphate usually around 17% phosphoric acid in water, at about 160° F. followed by another rinse at about 160° F. and a hot, chrome or non-chrome sealing solution (about 160° F.) to prevent rusting of the metal substrate. The substrates are then air dried and baked for 10–15 minutes at about 250° F. to dry.

The thermosetting powder adhesive material is thereafter applied to the metal substrate. In one embodiment the powder adhesive is applied to the metal substrate using an electrostatic process which comprises fluidizing the powder adhesive and then drawing off the powder adhesive, charging the powder adhesive relative to the metal substrate to be coated and spraying the powder adhesive toward the metal substrate. The powder adhesive then adheres to the parts by electrostatic attraction in a uniform thickness. The substrate and adhesive material are heated to allow the thermosetting adhesive material to flow and gel. The heating of the thermosetting adhesive material is sufficient to allow the thermosetting adhesive material to flow and form a uniform coating on the metal substrate but does not allow the thermosetting adhesive material to cure or substantially crosslink. The metal substrates coated this way and then heated to about 200°–450° F. and in certain embodiments to about 350°–450° F. for a period of time ranging from 30 seconds to 30 minutes and in certain about 30 seconds to 4 minutes, depending on the size of the metal substrate. This gelling or B-staging of the powder thermosetting adhesive material permits the metal substrates to be handled easily. The desired film thickness of the deposited adhesive material depends on the shape of the metal substrate, the viscosity of the thermosetting adhesive in its melted state, and the pressure used to bond the friction material to the metal substrate. The film thicknesses of the thermosetting adhesive on the metal substrate can range from about 0.1 mils to 20 mils and in certain embodiments 0.3 mils to 8.0 mils.

In certain embodiments it is preferred that the coated substrate be allowed to cool to a point where the gelled or B-staged thermosetting adhesive material is easily handleable. To form a composite friction element, the friction material is placed adjacent the metal substrate. Heat (preferably in the range of about 350°-600°) and, optionally, pressure (at least about 10-1000 psi) are applied to the friction material and the metal substrate for a period of time ranging from 10 seconds to about 20 minutes. Under the conditions of elevated temperature and optional pressure, the gelled thermosetting adhesive powder crosslinks and bonds the friction material to the substrate.

to the solvent-based adhesives. Further, the flexibility of the thermosetting adhesive materials was tested using the standard dry bend, wet bend and chisel test. The thermosetting adhesive has a greater flexibility and requires less use of curing agents than solvent-based adhesives.

Table 2 below shows the disc shear test of the formulations shown in Table 1 above, other powder thermosetting formulations, and comparative examples 1-3. Temperatures are shown in degrees F and pressure is shown in pounds per square inch (PSI). The comparative Examples 1-3 are currently used solvent-based adhesive materials. The formulations 1-7 are those formulations given in Table 1 above. Examples 8 and 9 are powdered thermosetting adhesive materials comprising straight n-butyl modified phenolic resin compositions. As can be seen in Table 2, the powder thermosetting adhesive formulations provide excellent results and in formulations 6 and 7, the disc shear in automatic transmission fluid is 2-3 times greater than for the solvent-based thermosetting adhesives.

TABLE 2

DISC SHEAR TEST

| Adhesive | Disc Shear @77 +/− 2° F. (PSI) | Disc Shear @400 +/− 5° F. (PSI) | Automatic Transmission Fluid 24 Hours at 300 +/− 2° F. | |
|---|---|---|---|---|
| | | | Disc Shear @77 +/− 2° F. (PSI) | Disc Shear @400 +/− 5° F. (PSI) |
| Comparative Example 1 | 3,290 | 529 | N/A | N/A |
| Comparative Example 2 | 2,145 | 527 | 2,780 | 1,200 |
| Comparative Example 3 | 3,615 | 487 | 4,523 | 953 |
| Formulation 1 | 6,180 | 478 | 6,200 | 518 |
| Formulation 2 | 5,685 | 293 | 5,620 | 398 |
| Formulation 3 | 5,380 | 258 | 5,150 | 403 |
| Formulation 4 | 5,230 | 308 | 5,910 | 408 |
| (repeat of formulation 1) | 6,060 | 427 | 5,290 | 476 |
| Formulation 5 | 450 | 90 | 1,833 | 95 |
| Formulation 6 | 5,410 | 1,683 | 3,460 | 2,538 |
| Formulation 7 | 5,270 | 1,733 | 5,740 | 2,402 |
| Example 8 | 3,750 | 585 | 3,955 | 850 |
| Example 9 | 4,805 | 107 | 4,647 | 58 |

213 straight n-butyl modified phenolic compounds

In FIG. 1 a schematic diagram of a front view of the electrostatic deposition of the thermosetting powder adhesive is generally shown. An overhead monorail conveyor 12 generally supports a bracket 14 for holding the metal substrate 16. Electrostatic powder spray guns 18 dispense charged thermosetting adhesive material 20 onto the substrate 16.

Figure 2:
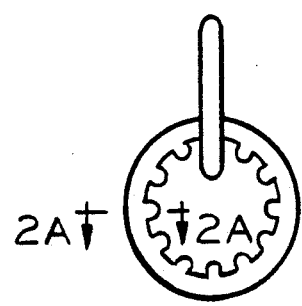
FIG. 2 is a side view of one type of metal substrate having adhered thereto to a thermosetting powdered adhesive material.

FIG. 2 shows a side view generally showing the metal substrate held in position on the bracket 14.

Figure 2A:
FIG. 2a is a cross section along line 2a-2a of FIG. 2.

FIG. 2a is an enlarged cross-sectional view along lines 2a—2a in FIG. 2 showing the metal substrate 16 and the powder adhesive material 20 gelled onto the entire surface of the metal substrate 16 in a uniform manner.

Figure 3:
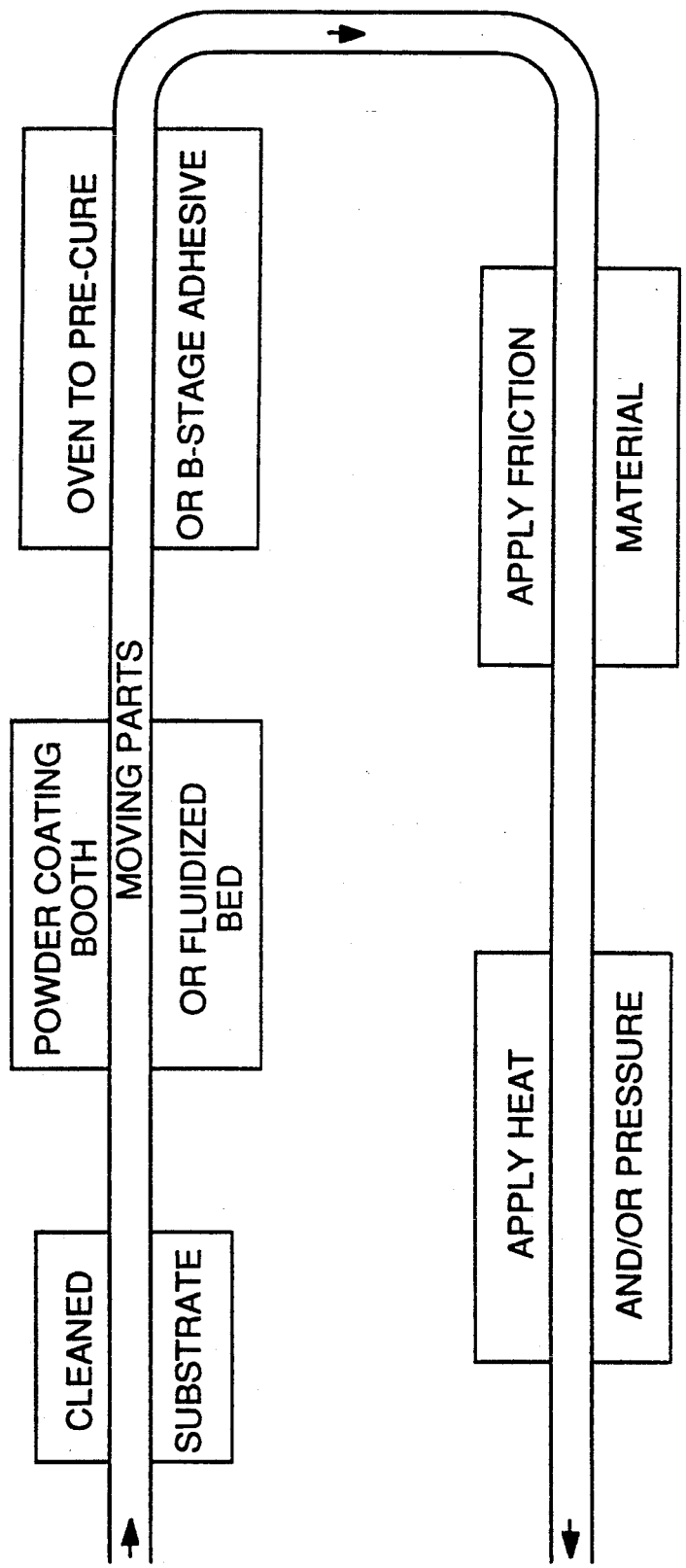
FIG. 3 is a schematic diagram showing the processing of a composite friction element.

FIG. 3 is a schematic diagram of the coating of a metal substrate. The metal substrate can pass through a powder coating booth or through a fluidized bed. Thereafter the coated metal substrate is passed through an oven to precure or B-stage the adhesive material. Thereafter, the coated metal substrate passes through an assembly process to apply the friction material with pressure and heat to attach the friction material and to cure the thermosetting adhesive.

Figure 4:
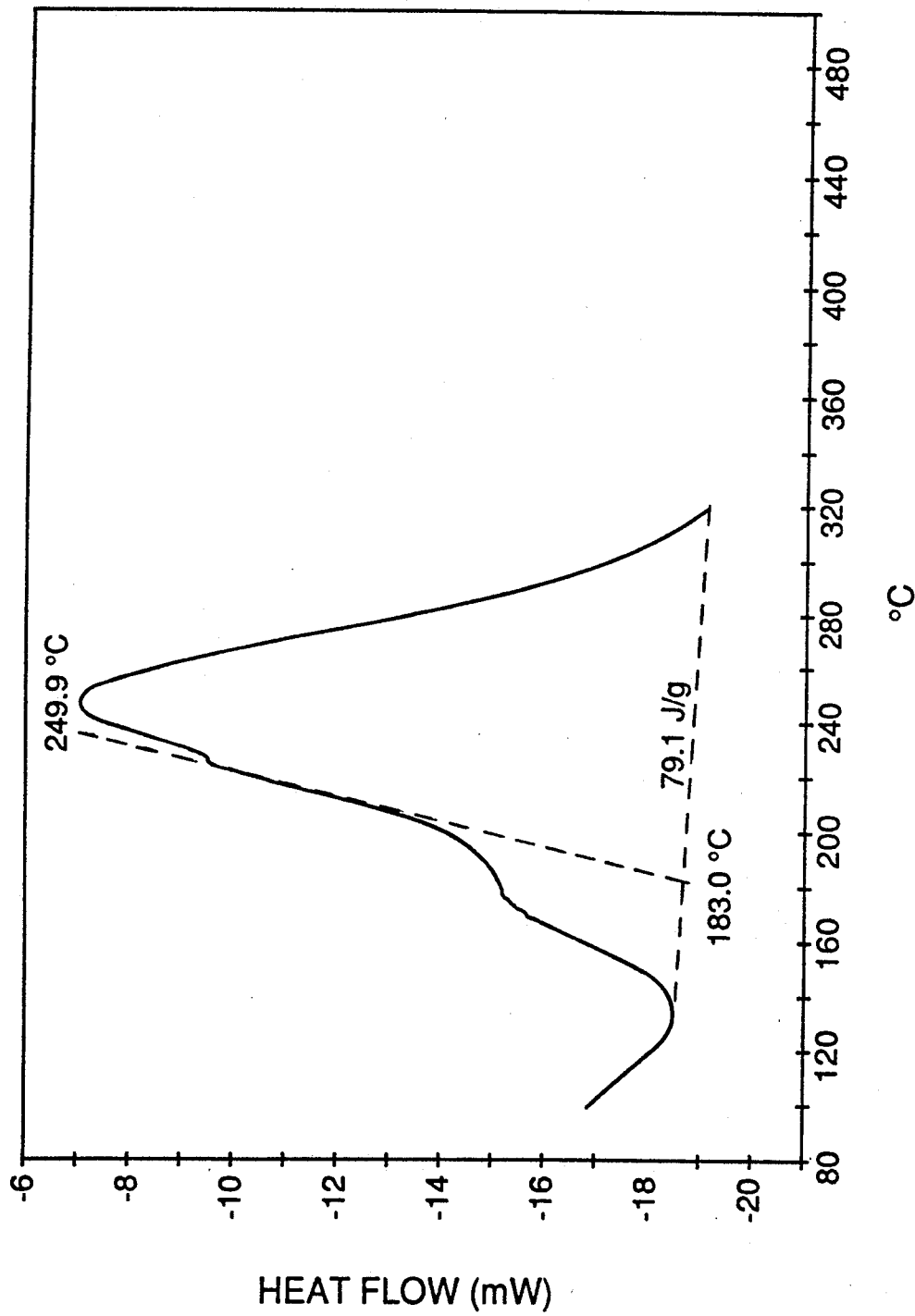
FIG. 4 is a differential scanning calorimetry graph for the formulation 7 shown in Table 1.

In practice, it has been found that the thermosetting adhesive material has 2-3 times greater adhesive and cohesive strength at high temperatures when compared FIG. 4 depicts a differential scanning calorimetry graph for the formulation #7 shown in Table 1. As can be seen, the precure or B-stage of the adhesive formulation occurs at the temperatures of about 120°-220° C. (250°-450° F.). While the actual thermosetting or cross-linking of the adhesive formulation occurs at about 220°-320° C. (450°-600° F.).

The above descriptions of the preferred and alternative embodiments of the present invention are intended to be illustrative and are not intended to be limiting upon the scope and content of the following claims.

I claim:

1. A composite friction element comprising
   (a) a metal or paper substrate;
   (b) a friction material;
   (c) an effective amount of an adhesive material between the substrate and the friction material, the adhesive material being a powdered solventless thermosetting adhesive material that has cross-linked to bond the friction material to the substrate; the adhesive material comprising a resin formulation, in weight percent, of:
   (1) at least one of the following:
      (a) 0-70 weight percent range of bisphenol A epoxy resin, unmodified;

(b) 0-70 weight percent range of bisphenol A epoxy resin, modified with novolak epoxy; or, (c) 0-95 weight percent range of multifunctional epoxy O-cresol novolak resin; and, (2) 5-10 weight percent range of bisphenol A epoxy resin with a flow modifier comprising an acrylic acid butyl ester.

2. The composite friction element of claim 1, wherein the adhesive material further comprises, based on parts per hundred of the resin formulation, from about 0 to about 30 parts per hundred of a hydroxyl type phenolic O-cresol novolak resin.

3. The composite friction element of claim 1, wherein the adhesive material further comprises an imidazole catalyst.

4. The composite friction element of claim 1, wherein the adhesive material further comprises an imidazole catalyst.

5. The comprises friction element of claim 4, wherein the adhesive material further contains a filler material.

6. The composite friction element of claim 1, wherein the adhesive material comprises:

from about 30 to about 95 weight percent range of multifunctional epoxy O-cresol novolak resin, based on the weight percent of the resin formulation;

from about 7 to about 9 weight percent range of bisphenol A epoxy resin with a flow modifier, based on the weight percent of the resin formulation;

from about 18 to about 22 parts per hundred of an aromatic amine comprising 4,4'-diaminodiphenyl sulfone, based on parts per hundred of the resin formulation;

from about 0.1 to about 0.4 parts per hundred of an imidazole catalyst, based on parts per hundred of the resin formulation; and, from about 115 to about 125 parts per hundred of a filler material, based on parts per hundred of the resin formulation.

7. The composite friction element of claim 1 wherein the substrate is a metal clutch plate, transmission band, brakeshoe, synchronizer ring, friction disc or piston plate.

8. A composite friction element comprising
(a) a substrate;
(b) a friction material;
(c) an effective amount of a solventless adhesive thermosetting material having a resin formulation, in weight percent, of:
(1) at least one of
 (a) 0-70 weight percent range of bisphenol A epoxy resin, unmodified;
 (b) 0-70 weight percent range of bisphenol A epoxy resin, modified with novolak epoxy; or
 (c) 0-95 weight percent range of multifunctional epoxy O-cresol novolak resin; and,
(2) 5-10 weight percent range of bisphenol A epoxy resin with a flow modifier comprising an acrylic acid butyl ester; wherein the composite friction element is formed by a process which includes the steps of applying a coating of the solventless thermosetting adhesive material in a powdered form to the substrate;

heating the substrate coated with the thermosetting adhesive material to allow the adhesive material to flow and gel, wherein the thermosetting adhesive material is heated to a temperature below the thermosetting temperature of the adhesive material such that the thermosetting material does not substantially crosslink;

applying the friction material to at least one surface of the substrate coated with the adhesive material to form the composite friction element; and, heating the composite friction element, optionally under pressure, to allow the thermosetting adhesive material to crosslink and secure the friction material to the substrate.

9. The composite friction element of claim 8, wherein the adhesive material further comprises, based on parts per hundred of the resin formulation, from about 0 to about 30 parts per hundred of a hydroxyl type phenolic O-cresol novolak resin.

10. The composite friction element of claim 8, wherein the adhesive material further comprises, based on parts per hundred of resin formulation, about 0 to about 25 parts per hundred of an aromatic amine comprising 4,4'-diaminodiphenyl sulfone.

11. The composite friction element of claim 8, wherein the adhesive material further comprises an imidazole catalyst.

12. The composite friction element of claim 11, wherein the adhesive material further contains a filler material.

13. The composite element of claim 8, wherein the adhesive material comprises:

from about 30 to about 95 weight percent range of multifunctional epoxy O-cresol novolak resin, based on the weight percent of the resin formulation;

from about 7 to about 9 weight percent range of bisphenol A epoxy resin with a flow modifier, based on the weight percent of the resin formulation;

from about 18 to about 22 parts per hundred of an aromatic amine comprising 4,4'-diaminodiphenyl sulfone, based on parts per hundred of the resin formulation;

from about 0.1 to about 0.4 parts per hundred of an imidazole catalyst, based on parts per hundred of the resin formulation; and, from about 115 to about 125 parts per hundred of a filler material, based on parts per hundred of the resin formulation.

14. The composite friction element of claim 8, wherein the substrate is a metal clutch plate, transmission band, brake shoe, synchronizer ring, friction disc or piston plate.

15. The composite friction element of claim 8, wherein the heated substrate and thermosetting adhesive material are allowed to cool to a point where the thermosetting adhesive material is easily handleable.

16. The composite friction element of claim 8, wherein the substrate is cleaned by grit blasting, galvanic etching, acid etching, or iron phosphate washing prior to the application of the thermosetting adhesive material.

17. The composite friction element of claim 8, wherein the thermosetting adhesive material is applied to the substrate at a thickness from about 0.1 to about 20.0 mils.

18. The composite friction element of claim 8, wherein the thermosetting adhesive material is applied to the substrate at a thickness from about 0.2 to about 8.0 mils.

19. The composite friction element of claim 8, wherein the substrate and thermosetting adhesive material are heated to a range from about 200° to about 600° F. for a time sufficient to allow the adhesive material to flow and gel.

20. The composite friction element of claim 8, wherein the substrate and thermosetting adhesive material are heated to a range from about 250° to about 350° F. for a time sufficient to allow the adhesive material to flow and gel.

21. The composite friction element of claim 8, wherein the composite friction element is heated to under a temperature from about 200° to about 600° F., optionally at a pressure of about 10–1000 psi, for a time sufficient wherein the thermosetting material crosslinks and bonds the friction to the substrate.

22. The composite friction element of claim 8, wherein the thermosetting adhesive material is applied to the substrate using an electrostatic charge.

23. The composite friction element of claim 8, wherein the thermosetting adhesive material is applied to the substrate by passing the substrate through a fluidized bed of the thermosetting adhesive material.

* * * * *